United States Patent
Hashizume et al.

(10) Patent No.: US 7,139,099 B2
(45) Date of Patent: Nov. 21, 2006

(54) IMAGE PROCESSING DEVICE AND IMAGE PROCESSING METHOD

(75) Inventors: Takashi Hashizume, Iwatsuki (JP); Tomio Hemmi, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 774 days.

(21) Appl. No.: 09/790,712

(22) Filed: Feb. 23, 2001

(65) Prior Publication Data
US 2001/0017705 A1    Aug. 30, 2001

(30) Foreign Application Priority Data
Feb. 23, 2000    (JP) ............................. 2000-046611

(51) Int. Cl.
*G06K 1/00* (2006.01)
*G06F 15/00* (2006.01)

(52) U.S. Cl. .................. 358/2.1; 358/1.9; 358/426.12; 358/539

(58) Field of Classification Search ................ 382/299, 382/232, 233; 358/426.01, 426.04, 426.12, 358/539, 1.9, 2.1
See application file for complete search history.

(56) References Cited

U.S. PATENT DOCUMENTS

| | | | |
|---|---|---|---|
| 5,583,953 A * | 12/1996 | Harrington | 382/239 |
| 5,684,895 A * | 11/1997 | Harrington | 382/233 |
| 6,016,360 A * | 1/2000 | Nguyen et al. | 382/166 |
| 6,373,890 B1 * | 4/2002 | Freeman | 375/240 |

FOREIGN PATENT DOCUMENTS

JP    11-296670    10/1999

* cited by examiner

*Primary Examiner*—Thomas D. Lee
(74) *Attorney, Agent, or Firm*—Morgan, Lewis & Bockius, LLP

(57) ABSTRACT

Disclosed are an image processing device and an image processing method capable of generating a high-resolution color image of a fine gray scale from image data of a small information amount by using a small memory capacity. A character graphics image of high resolution generated by a character rasterizing block is converted by a conversion block to image data in which color information of one color is assigned per group of pixels, and tag information indicating whether the color information is used or not is added with respect to the multiple pixels to which the color information is assigned. By the tag information, while maintaining the high resolution, a fine gray scale can be assured. An image decoding block which has received such image data decodes the image data into a color image of output resolution by assigning the color information to the position indicated by the tag information. For example, the color of peripheral pixels may be assigned to a pixel to which no color information is assigned by the tag information.

13 Claims, 4 Drawing Sheets

IMAGE PROCESSING DEVICE AND IMAGE PROCESSING METHOD

BACKGROUND OF THE INVENTION

1. Field of the Invention

The present invention relates to an image processing device capable of decoding a high-quality, high-resolution color image from a small amount of image data.

2. Description of the Related Art

In order to output a fine image in a color printer, it is necessary to simultaneously satisfy a fine gray scale and high resolution. However, a large amount of information is necessary to improve the gray scale and the resolution, so that a required memory capacity increases. When it is assumed that information of eight bits per color of RGB is provided, information of 24 bits per pixel is necessary. In the case where the resolution is 600 dpi, the data amount of an image in A4 size can reach 96 Mbytes. When a large amount of data is used, the following big problems arise. The cost of a memory for holding the data is high. Moreover, it takes long time to transfer and process data, and drawing time is long.

In order to solve the problems, as disclosed in, for example, Japanese Published Unexamined Patent Application No. 11-296670, a technique of generating a high-resolution image from a low-resolution image of a fine gray scale by an interpolating process is used. In the method, however, a pixel is generated by an interpolating process, so that the same picture quality as that of an image generated at high resolution from the beginning cannot be obtained. Especially in a character image, degradation in picture quality such as a distortion peculiar to the interpolating process is conspicuous.

In another technique, while maintaining the resolution, information of colors of which number is smaller than the number of pixels per block of a predetermined size is held in each block, and a value indicative of the assigned color is assigned in each of the pixels. According to the method, for example, since each of the pixels does not have to hold full-color information, the data amount can be reduced. In the method, however, if the size of each block is not large, the data amount cannot be reduced so much. When the data size of the block is increased, however, the pixels in the block have to be expressed only by the limited number of colors. It therefore causes a problem such that the color reproducibility becomes low and the picture quality is degraded.

SUMMARY OF THE INVENTION

In view of the problems noted above, the present invention provides an image processing device and an image processing method capable of generating a high-resolution color image of a fine gray scale from image data of a small information amount by using a small memory capacity.

According to the present invention, a color image of a predetermined resolution is decoded from image data including color information corresponding to a unit of multiple pixels at the predetermined resolution and tag information indicative of a pixel position for each of the multiple pixels at the predetermined resolution. Since the color information of one color is assigned to the unit of multiple pixels, the data amount can be reduced to a fraction of the data amount. To prevent deterioration of the resolution, the tag information indicative of the pixel position to which the assigned color information is used is added to the image data. Consequently, information of a shape or the like of characters can be maintained and the resolution can be therefore held. Since one bit of the tag information in this case is sufficient per pixel, an increase in data amount is small.

By receiving such image data and assigning the corresponding color information in accordance with the tag information, the image data can be decoded into a color image of the predetermined resolution. Since the fine gray scale is held by the color information and the resolution is held by the tag information in the received image data, the decoded color image has high resolution and a fine gray scale. Thus, a fine color image can be outputted.

The color of a pixel to which no color information is assigned by the tag information can be determined from the color of the peripheral pixels. The color of which pixels in the peripheral pixels is used can be determined from, for example, the tag information or by including reference position information indicating the color of pixels to be used in the peripheral pixels in the image data and assigning the color of the peripheral pixels according to the reference position information.

A portion in which the decoding using the tag information is performed and a portion to which another decoding method is applied may mixedly exist. For example, flag information indicating whether the decoding using the tag information is performed or not can be included in the image data. Particularly, in the character graphic portion, high resolution is required. In a photographic image portion, not so much of high resolution is required. The processes can be selectively performed according to the type of an image.

There is a case where a drawing command or the like is received and a specified image is drawn. In such a case, in characters which require high resolution, image data including the color information and the tag information as described above can be generated. Consequently, the data amount required until the image is decoded into a color image of predetermined resolution can be reduced. In the case of registering the generated image data of the character in a cache memory or the like and reusing the registered data, the data amount to be stored can be reduced and the efficiency can be improved.

BRIEF DESCRIPTION OF THE DRAWINGS

Preferred embodiment of the present invention will be described in detail based on the following, wherein.

DETAILED DESCRIPTION OF THE PREFERRED EMBODIMENTS

Figure 1:
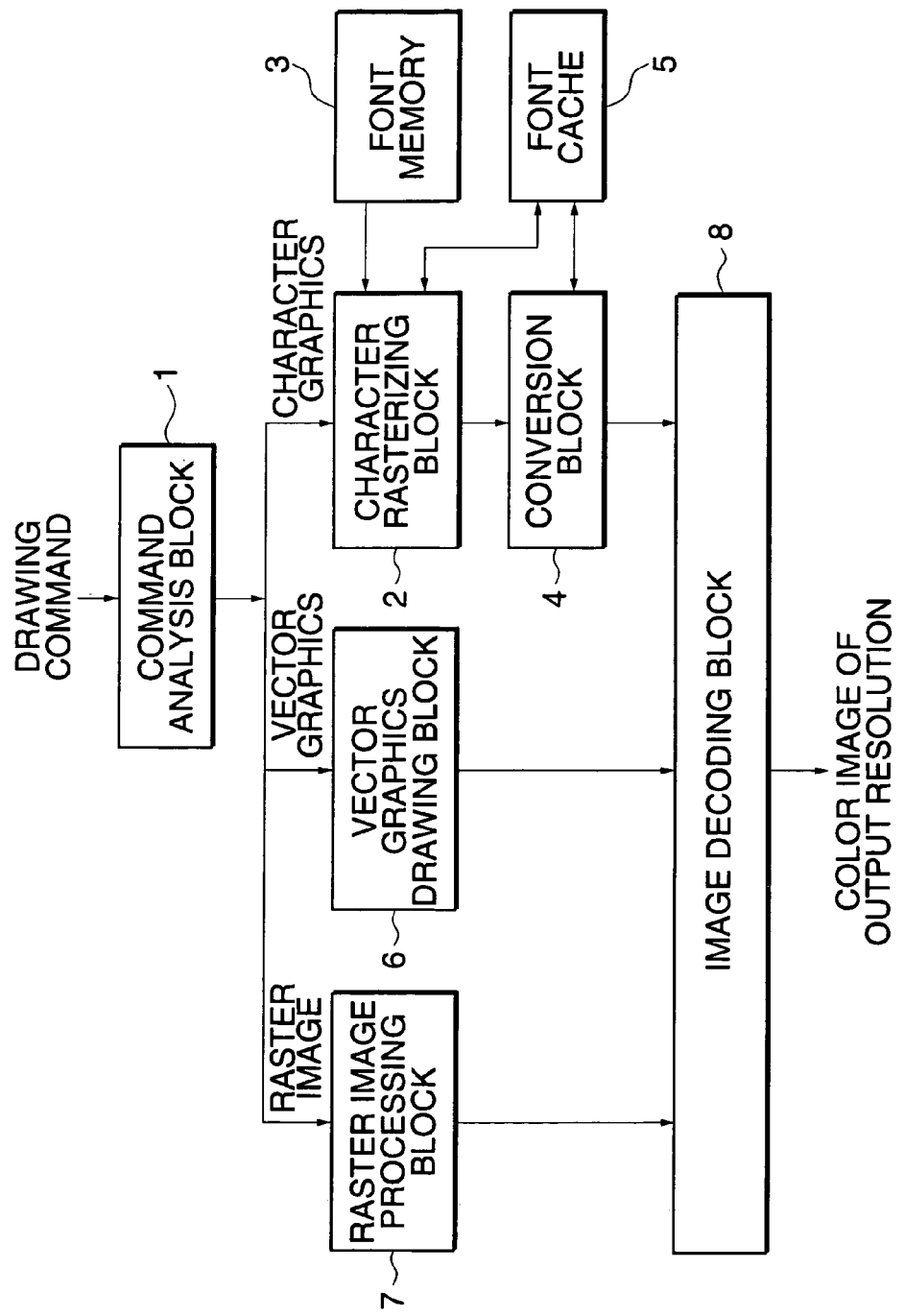
FIG. 1 is a block diagram showing an embodiment of an image processing device and an image processing method of the invention.

FIG. 1 is a block diagram showing an embodiment of an image processing device and an image processing method of the invention; Shown in FIG. 1 are a command analysis block 1, a character rasterizing block 2, a font memory 3, a conversion block 4, a font cache 5, a vector graphics drawing block 6, a raster image processing block 7, and an image decoding block 8. In the embodiment, a drawing command described in PDL (Page Description Language) or the like is received and a color image made by bitmap data of predetermined resolution is outputted.

The command analysis block 1 receives an input drawing command. In accordance with the drawing command, the command analysis block 1 gives an instruction. For example, when drawing of characters is instructed by the drawing command, the command analysis block 1 gives the instruction to the character rasterizing block 2. When drawing of vector graphics is instructed, the command analysis block 1 gives the instruction to the vector graphics drawing block 6. When drawing of a raster image such as a photograph is instructed, the command analysis block 1 gives the instruction to the raster image processing block 7. The drawing commands include not only such drawing commands but also various setting commands. The command analysis block 1 also processes the setting commands.

The character rasterizing block 2 generates specified characters in the form of bitmap data in accordance with the drawing command of a character sent from the command analysis block 1. Fonts corresponding to the characters are stored in the font memory 3. By reading a font from the font memory 3, the bitmap data of the specified character can be generated. The resolution of the bitmap data generated is that of a color image outputted from the image decoding block 8. When the specified character has been registered in the font cache 5, an instruction of using image data of the registered character is given to the conversion block 4.

The conversion block 4 converts bitmap data of the character generated by the character rasterizing block 2 into image data including: color information of one color for multiple pixels; and tag information indicative of a pixel position corresponding to the color information with respect to the multiple pixels corresponding to the color information. Consequently, the bitmap data is converted to image data of resolution which is a factor of the number of pixels collected, and the tag information is added to the image data. The image data will be described hereinafter. The image data obtained by the conversion is registered in associated with the character in the font cache 5. When an instruction of using graphics data registered in the font cache 5 is given from the character rasterizing block 2, the image data of the character registered in the font cache 5 is read and outputted as the image data converted.

The font cache 5 temporarily holds the image data which has been subjected to the converting process in the conversion block 4 in association with the character of the image data. In the case of drawing the same character, the image data registered in the font cache 5 can be therefore used. By omitting the generation of the bitmap data of the character and the converting process to the image data, the drawing process can be performed at higher speed. By holding the image data obtained by the conversion performed by the conversion block 4, the data amount held can be reduced. Thus, the number of characters which can be registered increases and the efficiency of processes can be improved.

The vector graphics drawing block 6 performs a process of drawing the specified graphics in accordance with a drawing command of vector graphics sent from the command analysis block 1. In a manner similar to, for example, a character, drawing data of the vector graphics generated by the vector graphics drawing block 6 can also be converted to image data including color information of one color for multiple pixels of the drawing data and tag information indicative of a pixel position corresponding to the color information with respect to the multiple pixels corresponding to the color information. Alternately, the drawing data can be outputted as intermediate language data such as an edge list.

The raster image processing block 7 performs a process on a raster image in accordance with a drawing command of a raster image sent from the command analysis block 1. Since the raster image itself is usually sent from the outside, it is unnecessary to perform a process of generating graphics such as characters or vector graphics. Not so much of high resolution is required for a raster image such as a photograph. For example, the resolution of a raster image supplied may be lower than that of a color image outputted from the image decoding block 8. Preferably, flag information indicating that decoding using tag information is not performed is added to an area in which the raster image is drawn for the image decoding block 8.

The image decoding block 8 performs a process of decoding image data of character sent from the conversion block 4, image data of vector graphics sent from the vector graphics drawing block 6, or a raster image sent from the raster image processing block 7 to a color image of output resolution. For example, when image data of characters or vector graphics is image data including the color information of one color for the multiple pixels and the tag information indicative of the pixel position corresponding to the color information with respect to the multiple pixels corresponding to the color information, the tag information is used. With respect to the pixel instructed by the tag information, the color information is assigned. A pixel which is not instructed by tag information is, for example, left as it is or a color of the pixel is determined from peripheral pixels. On conversion to image data in the conversion block 4 or the vector graphics drawing block 6, reference position information indicating that a color of which one of the peripheral pixels is assigned is added to a pixel which is not instructed by the tag information. The color of the pixel can be determined in accordance with the reference position information. When intermediate language data such as an edge list is transmitted as the drawing data of vector graphics, a painting process according to the intermediate language data is performed, thereby generating a color image of output resolution. Further, as for the raster image, it is sufficient to generate a color image of output resolution by, for example, an interpolating process which is conventionally performed. In many cases, the characters, vector graphics, raster image and the like mixedly exist in a page. Although a composite image is formed in the image decoding block 8 in the embodiment, the invention is not limited to the method. For example, they may be prepared as intermediate language data which is decoded into a composite color image of output resolution in the image decoding block 8.

Although the example in which the drawing command described in the PDL or the like is received and the color image of output resolution is outputted is shown in FIG. 1, the invention is not limited to the example. For instance, intermediate language data in an edge list format may be supplied. It is also possible to use a configuration such that image data including color information when multiple pixels are made to correspond to one pixel and tag information indicative of the pixel position having the color information with respect to the multiple pixels corresponding to the pixel of the color information is entered and decoded into a color image of output resolution by the image decoding block 8.

Figure 2A:
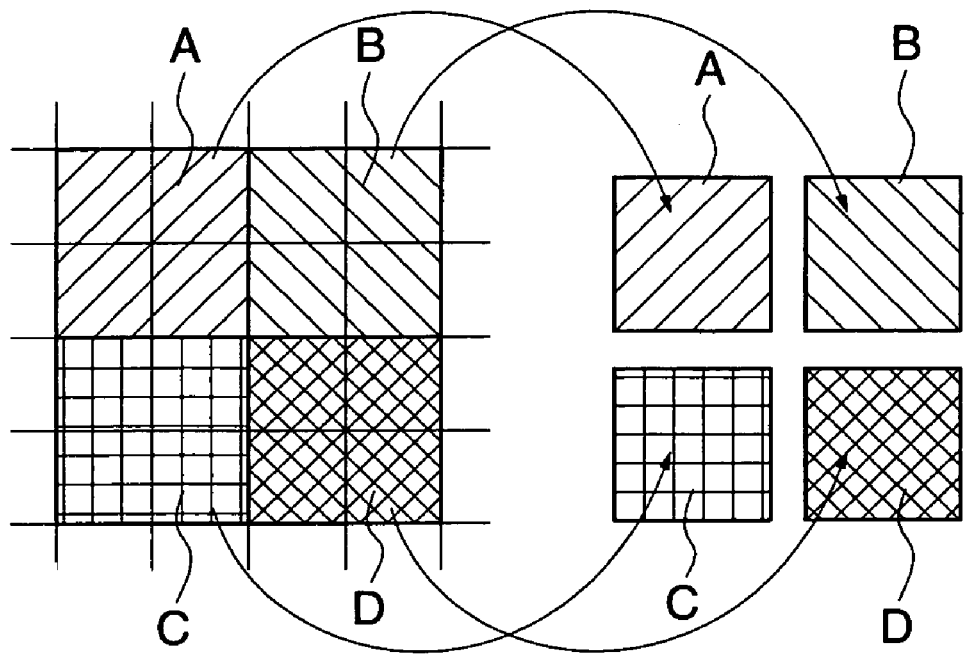
FIGS. 2A to 2B are explanatory diagrams showing an example of information included in image data in the invention.
Figure 2B:
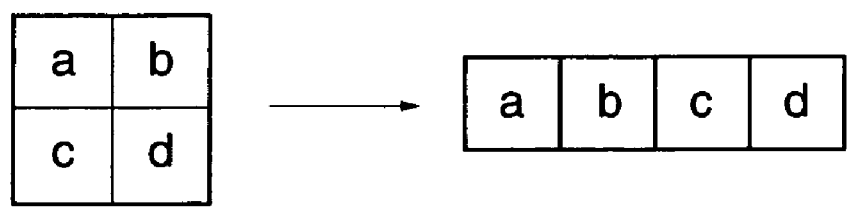

The image data including the color information and the tag information will now be described by using a specific example. FIGS. 2A to 2B are explanatory diagrams showing an example of information included in the image data in the invention. As described above, when it is assumed that image data has information of, for example, 8 bits for each of RGB colors as color information for expressing a color image, information of 24 bits is necessary per pixel. When the resolution is 600 dpi, the data amount the A4 size image is as much as 96 Mbytes. However, there are not many images such that color information in neighboring multiple pixels is different from each other exist. For example, in characters, only a color of characters and a background color. Paying attention to the fact, in the invention, color information of one color is assigned to multiple pixels. Assuming now that, in bitmap data shown in FIG. 2A, color information of one color is assigned every four pixels, the data amount decreases to a quarter. For example, in an image of 600 dpi, image data of color information corresponds to image data of 300 dpi.

The resolution in this case deteriorates, however. For example, in characters and the like, image quality deteriorates. In order to prevent deterioration in picture quality in a portion which is requested to have high resolution such as a character portion, tag information indicative of pixel to which color information is assigned in the multiple pixels to which the color information is assigned is added. For example, in the case of assigning color information of one color to four pixels, tag information (refer to FIG. 2B) indicating whether the assigned color is used or not with respect to the four pixels to which the color information is assigned, for example, four pixels a, b, c, and d shown in FIG. 2B. For instance, when the assigned color is assigned to the pixels a, b, and c, tag information corresponding to the pixels a, b, and c is set to "1" and tag information corresponding to the pixel d is set to "0". By such tag information, information of the shape of graphics to be drawn such as characters can be held.

In such a manner, the information of 96 bits of four pixels (24 bits×four pixels) can be expressed by image data of 28 bits including color information of 24 bits and tag information of 4 bits. In the case of, for example, a character image of 600 dpi, image data can be expressed by color information corresponding to 300 dpi and tag information added to the color information. In the example shown in FIGS. 2A to 2B, although image data to which the color information is assigned has low resolution, the information of multiple pixels corresponding to the color information is held by the tag information, thereby reducing the data amount.

Although one piece of color information is assigned every four pixels in the example of FIGS. 2A to 2B, the number of pixels to which color information of one color is assigned is arbitrary. The shape of the area of the multiple pixels to which color information is assigned is not limited to the shape as shown in FIG. 2A.

In the case of decoding the image data into a color image of output resolution by the image decoding block 8, in the example shown in FIGS. 2A to 2B, four pixels are prepared for one piece of color information. It is sufficient to assign the color indicated by the color information to pixels indicated by the tag information in the four pixels, for example, pixels having the tag information "1". By performing such a process with respect to all of the color information, image data having the resolution which is a quarter of the output resolution to which the color information is assigned is decoded into a color image of the output resolution. As in the above example, the color image of resolution of 600 dpi can be reproduced by the color information corresponding to the resolution of 300 dpi and the tag information added to the color information.

A pixel to which the color information is not assigned by the tag information does not have the color information to be assigned. For example, in the case of drawing characters, the background color is usually white (color of paper), so that a color image can be outputted without any problem by the above method.

In the case of drawing characters on a background color which is not white, however, deterioration in picture quality such as blank in a pixel to which no color information is assigned by the tag information as described above may occur. As one method for solving such a problem, the color of the pixel to which color information is not assigned by the tag information can be determined from the color of peripheral pixels. There is hardly a case such that only one pixel has a different color. Even if such a pixel exists, in many cases, it is inconspicuous. Consequently, it is not a problem to assume that the color of the peripheral pixels can be used as the color of the pixel to which color information is not assigned.

Figure 3A:
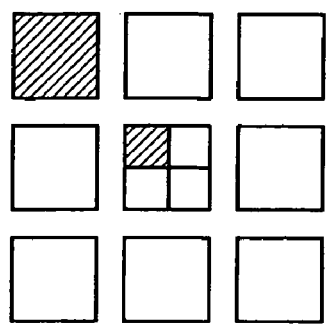
FIGS. 3A to 3D are explanatory diagrams showing an example of determining a color of a pixel to which color information is not assigned by tag information by using peripheral pixels.
Figure 3B:
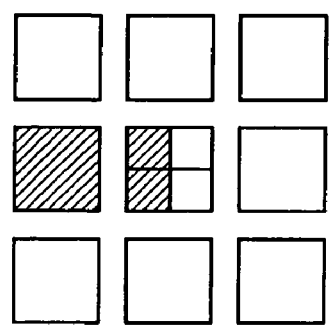
Figure 3C:
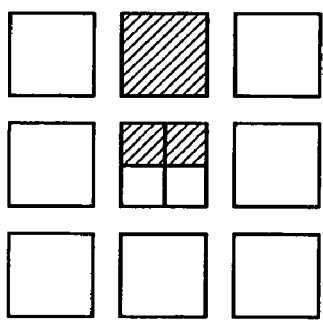
Figure 3D:
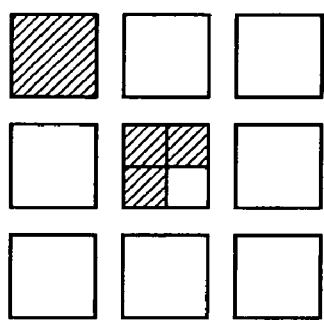

FIGS. 3A to 3D are explanatory diagrams showing an example of determining a color of the pixel to which the color information is not assigned by the tag information by peripheral pixels. For example, in FIG. 3A, when the color information is not assigned by the tag information to an upper-left hatched pixel in four pixels in the center, the color of upper-left pixels (color information assigned to hatched four pixels) can be assigned to the pixel having no color information. As shown in FIGS. 3B and 3C, when there are two neighboring pixels to which no color information is assigned by the tag information, the color of the pixels adjacent to the two pixels (color information assigned to hatched four pixels) can be assigned to the two pixels. When color information is not assigned by tag information to two pixels which are positioned in a diagonal line, the example of FIG. 3A can be applied to each of the pixels. FIG. 3D shows a case where there are three pixels to which color information is not assigned by tag information. In this case, the color of peripheral pixels (color information assigned to four pixels) which exist in the oblique direction of the center pixel in the neighboring three pixels may be assigned.

In the above examples, the color of neighboring pixels which is assumed to be the same color as that of the pixel to which no color information is assigned by tag information is applied to the pixel. The invention is not limited to the examples and a color to be applied can also be determined by other methods. For example, in the example shown in FIG. 3A, color information of a neighboring pixel on the left or upper side can be applied. In the example shown in FIG. 3D, color information of left, upper-left, and upper pixels can be applied to the three pixels to which no color information is assigned by the tag information.

In such a manner, the color of the pixel to which no color information is assigned by tag information can be automatically determined from the color of peripheral pixels (color information assigned to every four pixels in the periphery). Consequently, it is unnecessary to have much color information and the amount of image data can be decreased.

Figure 4:
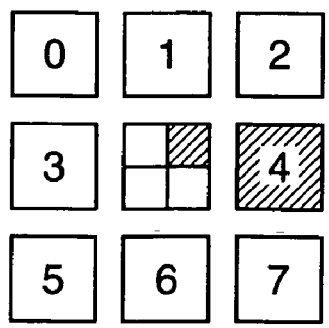
FIG. 4 is an explanatory diagram showing an example of reference position information.

When the color of a pixel to which no color information is assigned by tag information is automatically determined as described above, there is the possibility that the precision is insufficient. In order to improve the precision of determining colors, for example, a method of preliminarily designating peripheral pixels to be referred to is considered. As information for designating peripheral pixels to be referred to when the color of a pixel to which no color information is assigned by tag information is determined, reference position information can be included in image data. FIG. 4 is an explanatory diagram of an example of the reference position information. As shown in FIG. 4, it is assumed that no color information is assigned by tag information to the upper right pixel in four pixels in the center. According to the method shown in FIG. 3A, color information of the peripheral pixels indicated by '2' is selected. For example, when it is desired to assign color information of the peripheral pixels indicated by '4', '4' is added as reference position information to image data as shown in FIG. 4. At the time of performing a decoding process by the image decoding block 8, the color of the peripheral pixels (color information assigned every four pixels) indicated by the reference position information can be assigned to the pixel to which no color information is assigned by tag information. Consequently, colors can be determined more precisely than automatically assigning colors.

Neighboring pixels to be referred to exist in eight directions as shown by '0' to '7' in FIG. 4. Three bits of reference position information are therefore necessary per one piece of color information (per four pixels in this case). The total of the color information, tag information, and reference position information is 31 bits. The data amount is therefore much smaller as compared with the case where each of four pixels has color information (96 bits).

Although FIG. 4 shows an example in which only one pixel is assigned no color information by the tag information, the color of peripheral pixels can also be assigned to multiple pixels to which no color information is assigned by tag information by using common reference position information.

Figure 5:
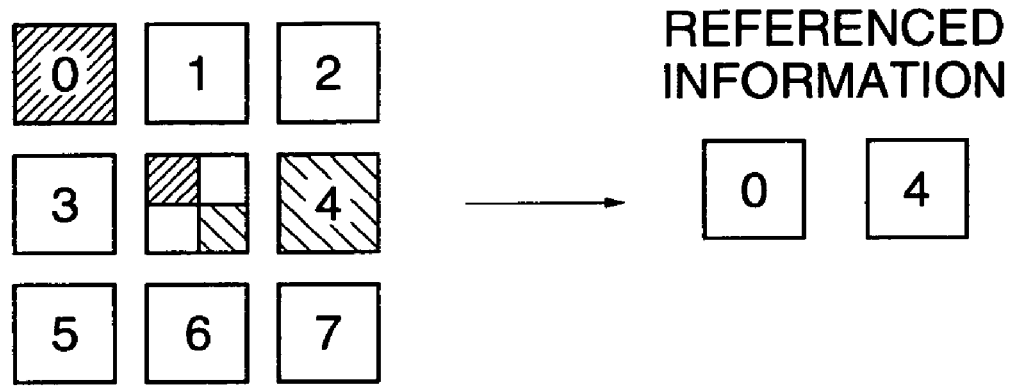
FIG. 5 is an explanatory diagrams diagram of another example of the reference position information.

In order to assign colors more precisely to multiple pixels to which no color information is assigned by tag information, image data can be constructed to have reference position information for each of pixels to which no color information is assigned by tag information. FIG. 5 is an explanatory diagram of another example of the reference position information. It is assumed that two differently hatched pixels in four pixels in the center shown in FIG. 5 are pixels to which no color information is assigned by tag information. In this case, as the two pixels are associated with reference position information. In the example, the color information of the pixels existing in the upper left direction of '0' is assigned to the upper left pixel in the four pixels. The color information of the pixels existing on the right side '4' is assigned to the lower right pixel in the four pixels.

By associating each of pixels to which no color information is assigned by tag information with the reference position information, an optimum color can be assigned in such a manner that different colors are assigned to the pixels. Thus, colors can be determined with higher precision.

In the case of adding the reference position information to each of the pixels to which no color information is assigned by tag information as described above, there is a case that three reference position information has to be added. Even in this case as well, the reference position information of only total nine bits (=3 bits×3 pixels) is sufficient. Total 37 bits is sufficient for the reference position information, color information, and tag information. In order to simplify the process of associating the position of the pixel to which no color information is assigned by the tag information with the reference position information, fields of reference position information can be provided to all of four pixels. In this case as well, total 40 bits is sufficient for the color information, tag information, and reference position information, which is less than the half of the data amount (96 bits) of the case where all of four pixels have color information.

By using the image data including the color information and the tag information and, optionally, the reference position information, the data amount can be decreased without deteriorating the resolution with respect to characters, vector graphics, and the like. It is not quite necessary for a raster image such as a photograph, an image having a uniform background, and the like to maintain the resolution as described above. For example, in a raster image such as a photograph, when the gray scale is sufficiently large and the resolution is sufficiently high, even if the resolution is changed, the picture quality does not deteriorate. Data of high resolution is not consequently necessary for a raster image. The process for maintaining the resolution by adding the tag information and decoding the image as described above is unnecessary. It is sufficient to perform a process of achieving the output resolution by an interpolating process or the like as conventionally carried out.

It is desirable to selectively perform the decoding process using the tag information and the conventional process in accordance with a target to be drawn. Preferably, flag information is provided to selectively perform the processes. For example, in the image data including the color information and the tag information and, optionally, the reference position information, the flag information can be added on the unit basis of an object or color information of the image data. With respect to a raster image as well, flag information can be added on the raster image unit basis or on the unit basis of pixels in the raster image.

The image decoding block 8 refers to such flag information. When the flag information instructs the decoding using tag information, a decoding process from the image data including the color information and the tag information and, optionally, the reference position information is performed. When the flag information indicates that no tag information is used, for example, a conventional decoding process is carried out or, depending on resolution, information is outputted as it is.

The example of assigning color information of one color every four pixels has been described with reference to FIGS. 2A to 2B to FIG. 5. The invention is not limited to the example. Color information of one color can be assigned every two or more arbitrary number of pixels and tag information having bits of the number corresponding to the number of pixels every which the color information is assigned is added.

For example, in characters and vector graphics, the ratio of using black is very high. By using this fact, for example, when the color is black, only information indicative of black of about one bit can be provided as color information. By the arrangement, the data amount can be further reduced.

In the example shown in FIG. 1, the drawing command described in the PDL or the like is received and a color image of output resolution is outputted. The invention is not limited to the example but arbitrary data may be inputted. Obviously, image data having the color information and the tag information and, optionally, the reference position information and the flag information may be directly supplied. In this case, it is sufficient that the image decoding block 8 is provided.

As obviously understood from the above description, according to the invention, a color image having high resolution and a fine gray scale can be generated from image data of a small data amount. Consequently, the capacity of a memory for storing image data and the like can be reduced, so that a low-cost image processing device can be provided. Since the amount of the image data is small, time required to transfer or process image data can be shortened. Thus, an effect such that the image processing device and the image processing method capable of outputting a high-resolution color image of a fine gray scale at high speed can be provided is produced.

What is claimed is:

1. An image processing device for outputting a color image of predetermined resolution, comprising:

an image decoding part which receives image data including color information corresponding to a unit of plural pixels at the predetermined resolution and tag information indicative of a pixel position for each pixel in the unit and whether color information is assigned to each pixel in the unit at the predetermined resolution, and decodes the image data into a color image of the predetermined resolution by assigning the color information to a pixel in the unit in accordance with the tag information, wherein the image decoding part assigns color information of a peripheral unit of pixels to a pixel in the unit, wherein the image data further includes reference position information for selecting a peripheral unit of pixels which is referred to with respect to a pixel in the unit whose color information is not assigned by the tag information, and the image decoding part assigns the color information of the peripheral unit of pixels selected in accordance with the reference position information.

2. An image processing device according to claim 1, wherein the image data has the reference position information for each pixel in the unit whose color information is not assigned by the tag information.

3. An image processing device according to claim 1, wherein the image data further includes flag information indicating whether decoding according to the tag information is performed, and when the flag information indicates the decoding according to the tag information, the image decoding part performs the decoding according to the tag information.

4. An image process device according to claim 1, further comprising:

a character rasterizing part which generates a character at the predetermined resolution; and a conversation part which converts the character generated by the character rasterizing part into image data including color information indicating a representative one color per unit of pixels in the character and tag information indicative of a pixel position of each pixel in the unit to which the color information is assigned, wherein the image data converted by the conversion part is supplied to the image decoding part.

5. An image processing device according to claim 4, further comprising a cache memory which stores image data corresponding to the character converted by the conversion part, wherein when a character whose corresponding image data has been stored in the cache memory is to be generated by the character rasterizing part, the corresponding image data stored in the cache memory is used.

6. An image processing device according to claim 4, wherein the image decoding part performs decoding using the tag information at least on image data corresponding to portions of the character.

7. An image processing method for outputting a color image of a predetermined resolution, comprising the steps of:

receiving image data including color information corresponding to a unit of plural pixels at the predetermined resolution and tag information indicative of a pixel position for each pixel in the unit and whether color information is assigned to each pixel in the unit at the predetermined resolution, and decoding the image data into a color image of the predetermined resolution by assigning the color information to a pixel in the unit in accordance with the tag information, wherein color information of a peripheral unit of pixels is assigned to a pixel in the unit, wherein the image data further includes reference position information for selecting a peripheral unit of pixels which is referred to with respect to a pixel in the unit whose color information is not assigned by the tag information, and the color information of the peripheral unit of pixels selected in accordance with the reference position information.

8. An image processing method according to claim 7, wherein the image data has the reference position information for each pixel in the unit whose color information is not assigned by the tag information, and the color information of the peripheral unit of pixels selected in accordance with the corresponding reference position information is assigned to the pixel in the unit whose color information is not assigned by the tag information.

9. An image processing method according to claim 7 wherein the image data further includes flag information indicating whether decoding according to the tag information is performed, and when the flag information indicates the decoding according to the tag information, the decoding according to the tag information is performed.

10. An image processing method according to claim 7, further comprising:

generating a character at the predetermined resolution;

converting the generated character into image data including color information indicating a representative one color per unit of pixels in the character and tag information indicative of a pixel position of each pixel in the unit to which the color information is assigned; and decoding the converted image data into a color image of the predetermined resolution.

11. An image processing method according to claim 10, further comprising:

storing image data corresponding to the converted character, wherein when a character whose corresponding image data has been stored is to be generated, the corresponding image data stored is used.

12. An image processing method according to claim 10, wherein the decoding is performed by using the tag information at least on image data corresponding to portions of the character.

13. An image processing device for outputting a color image of predetermined resolution, comprising:

an image decoding part that receives image data including color information corresponding to a unit of plural pixels at the predetermined resolution and tag information, and decodes the image data into a color image by assigning the color information to a pixel in the unit in accordance with the tag information, wherein the tag information is indicative of a pixel position for each pixel in the unit and whether the color information is assigned to each pixel in the unit at the predetermined resolution, wherein the image data further includes reference position information, wherein the image decoding part assigns color information of a peripheral unit of pixels to a pixel in the unit, whose color information is not assigned by the tag information, according to the reference position information.

* * * * *